United States Patent
Cypher

(10) Patent No.: US 7,606,932 B1
(45) Date of Patent: Oct. 20, 2009

(54) ADDRESS PACKETS WITH VARIABLE-SIZE MASK FORMAT

(75) Inventor: Robert E. Cypher, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1071 days.

(21) Appl. No.: 10/713,397

(22) Filed: Nov. 14, 2003

(51) Int. Cl.
*G06F 15/16* (2006.01)

(52) U.S. Cl. .................. 709/236; 370/470; 370/472; 370/476

(58) Field of Classification Search ............. 709/234, 709/236, 230, 232; 710/30; 370/470–476
See application file for complete search history.

(56) References Cited

U.S. PATENT DOCUMENTS

| | | | | |
|---|---|---|---|---|
| 5,873,121 | A | * | 2/1999 | Merchant et al. ............ 711/200 |
| 6,122,189 | A | * | 9/2000 | Batra ........................ 365/120 |
| 6,175,884 | B1 | * | 1/2001 | Harriman et al. ............ 710/30 |
| 7,013,157 | B1 | * | 3/2006 | Norman et al. ............. 709/230 |
| 7,069,436 | B1 | | 6/2006 | Akachi |
| 7,185,103 | B1 | * | 2/2007 | Jain ........................ 709/234 |

* cited by examiner

*Primary Examiner*—Ramy Mohamed Osman
(74) *Attorney, Agent, or Firm*—Meyertons, Hood, Kivlin, Kowert & Goetzel, P.C.; B. Noel Kivlin

(57) ABSTRACT

A system may include a device configured to initiate a transaction by sending an address packet and an additional device configured to respond to the address packet. The additional device is coupled to receive the address packet from the device via an address network. The address packet includes a mask field configured to indicate which of N quantities of data are targeted by the transaction. The address packet also includes a granularity field configured to indicate a size of each of the N quantities of data. If the size is less than a maximum size, a portion of the granularity field stores additional address bits of an address of the N quantities of data. If the size is the maximum size, none of the granularity field stores any additional address bits of the address of the N quantities of data.

21 Claims, 6 Drawing Sheets

| MaskType[3] | MaskType[2] | MaskType[1] | MaskType[0] | Mask[7:0] 212 Granularity | Mask[7:0] 212 Meaning |
|---|---|---|---|---|---|
| Address[5] | Address[4] | Address[3] | 1 | 1 byte | Mask of 8 1-byte quantities at locations (Address[J-1:3],000) through (Address[J-1:3],111) |
| Address[5] | Address[4] | 1 | 0 | 2 bytes | Mask of 8 aligned 2-byte quantities at locations (Address[J-1:4],0000) through (Address[J-1:4],1110) |
| Address[5] | 1 | 0 | 0 | 4 bytes | Mask of 8 aligned 4-byte quantities at locations (Address[J-1:5],00000) through (Address[J-1:5],11100) |
| 1 | 0 | 0 | 0 | 8 bytes | Mask of 8 aligned 8-byte quantities at locations (Address[J-1:6],000000) through (Address[J-1:6],111000) |

MaskType (Granularity) 210

| Mask Bit | Mask[7:0] 212 Granularity | | |
|---|---|---|---|
| | 1 Byte | 2 Bytes | 4 Bytes | 8 Bytes |
| Mask[0] | (Address[46:3],000) | (Address[46:4],0000) through (Address[46:4],0001) | (Address[46:5],00000) through (Address[46:5],00011) | (Address[46:6],000000) through (Address[46:6],000111) |
| Mask[1] | (Address[46:3],001) | (Address[46:4],0010) through (Address[46:4],0011) | (Address[46:5],00100) through (Address[46:5],00111) | (Address[46:6],001000) through (Address[46:6],001111) |
| Mask[2] | (Address[46:3],010) | (Address[46:4],0100) through (Address[46:4],0101) | (Address[46:5],01000) through (Address[46:5],01011) | (Address[46:6],010000) through (Address[46:6],010111) |
| Mask[3] | (Address[46:3],011) | (Address[46:4],0110) through (Address[46:4],0111) | (Address[46:5],01100) through (Address[46:5],01111) | (Address[46:6],011000) through (Address[46:6],011111) |
| Mask[4] | (Address[46:3],100) | (Address[46:4],1000) through (Address[46:4],1001) | (Address[46:5],10000) through (Address[46:5],10011) | (Address[46:6],100000) through (Address[46:6],100111) |
| Mask[5] | (Address[46:3],101) | (Address[46:4],1010) through (Address[46:4],1011) | (Address[46:5],10100) through (Address[46:5],10111) | (Address[46:6],101000) through (Address[46:6],101111) |
| Mask[6] | (Address[46:3],110) | (Address[46:4],1100) through (Address[46:4],1101) | (Address[46:5],11000) through (Address[46:5],11011) | (Address[46:6],110000) through (Address[46:6],110111) |
| Mask[7] | (Address[46:3],111) | (Address[46:4],1110) through (Address[46:4],1111) | (Address[46:5],11100) through (Address[46:5],11111) | (Address[46:6],111000) through (Address[46:6],111111) |

ADDRESS PACKETS WITH VARIABLE-SIZE MASK FORMAT

BACKGROUND OF THE INVENTION

1. Field of the Invention

This invention relates to the field of multiprocessor computer systems and, more particularly, to communication within multiprocessor computer systems.

2. Description of the Related Art

Multiprocessing computer systems include two or more processors that may be employed to perform computing tasks. A particular computing task may be performed upon one processor while other processors perform unrelated computing tasks. Alternatively, components of a particular computing task may be distributed among multiple processors to decrease the time required to perform the computing task as a whole.

Various components within a multiprocessing computer system may communicate with each other during operation. For example, various components may participate in a communication protocol that involves sending and receiving communications. A popular architecture in commercial multiprocessing computer systems is a shared memory architecture in which multiple processors share a common memory. In shared memory multiprocessing systems, a cache hierarchy is typically implemented between the processors and the shared memory. In order to maintain the shared memory model, in which a particular address stores exactly one data value at any given time, the communication protocol implemented in shared memory multiprocessing systems include a coherency protocol. Generally speaking, an operation is coherent if the effects of the operation upon data stored at a particular memory address are reflected in each copy of the data within the cache hierarchy. For example, when data stored at a particular memory address is updated, the update may be supplied to the caches that are storing copies of the previous data. Alternatively, the copies of the previous data may be invalidated in the caches such that a subsequent access to the particular memory address causes the updated copy to be transferred from main memory or from a cache.

Communications sent between components of a multiprocessing computer system may include the address of data being accessed. The range of addressable space within a multiprocessing system may be large, and thus addresses may contain a significant number of bits. This may, in turn, increase the size of the communications sent between devices.

SUMMARY

Various embodiments of systems and methods implementing a variable-size mask format are disclosed. In one embodiment, a system may include a device configured to initiate a transaction by sending an address packet and an additional device configured to respond to the address packet. The additional device is coupled to receive the address packet from the device via an address network. The address packet includes a mask field configured to indicate which of N quantities of data are targeted by the transaction. The address packet also includes a granularity field configured to indicate a size of each of the N quantities of data. If the size is less than a maximum size, a portion of the granularity field stores additional address bits of an address of the N quantities of data. If the size is the maximum size, none of the granularity field stores any additional address bits of the address of the N quantities of data.

BRIEF DESCRIPTION OF THE DRAWINGS

A better understanding of the present invention can be obtained when the following detailed description is considered in conjunction with the following drawings, in which:

FIG. 4 illustrates exemplary values of a granularity field that indicates the size of data quantities selected by a mask field, according to one embodiment.

FIG. 5 illustrates how bits in a mask field may correspond to different sizes of data quantities, according to one embodiment.

Figure 1:
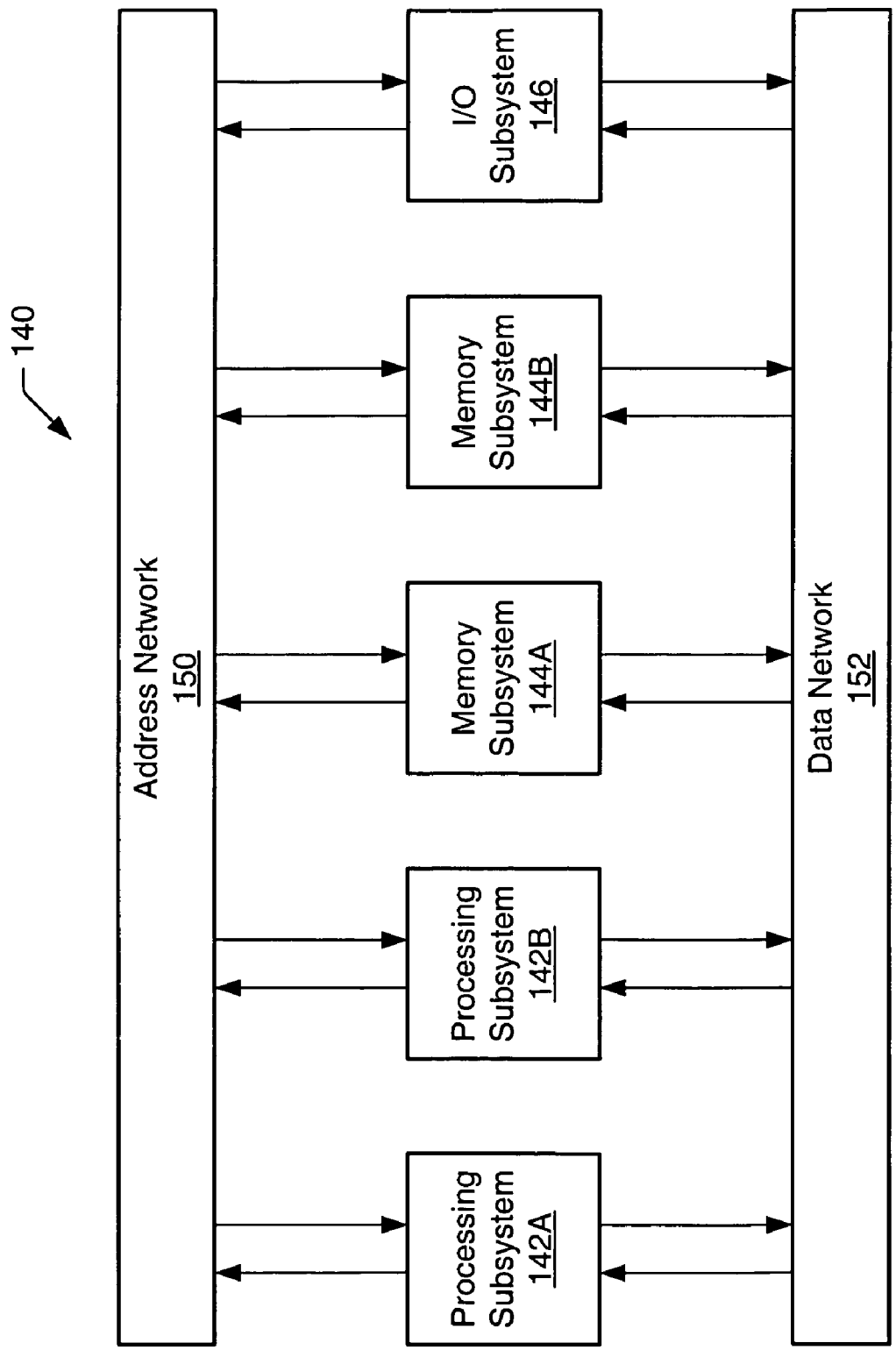
FIG. 1 is a block diagram of a multiprocessing computer system, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System

FIG. 1 shows a block diagram of one embodiment of a computer system 140 that may implement address packets that include a variable-size mask. Computer system 140 includes processing subsystems 142A and 142B, memory subsystems 144A and 144B, and an I/O subsystem 146 interconnected through an address network 150 and a data network 152. In the embodiment of FIG. 1, each of processing subsystems 142, memory subsystems 144, and I/O subsystem 146 is referred to as a client device. It is noted that although five client devices are shown in FIG. 1, embodiments of computer system 140 employing any number of client devices are contemplated. Furthermore, some client devices may include the functionality of multiple devices (e.g., a processing subsystem 142 may be integrated with all or part or a memory subsystem 144 and/or an I/O subsystem 146) in some embodiments. Elements referred to herein with a particular reference number followed by a letter may be collectively referred to by the reference number alone. For example, processing subsystems 142A-142B may be collectively referred to as processing subsystems 142.

Each of processing subsystems 142 and/or I/O subsystem 146 may communicate according to a communication protocol in order to perform activities such as accessing data at addresses mapped to memory subsystems 144 and/or I/O subsystems 146. Devices configured to perform accesses to memory subsystems 144 are referred to herein as "active" devices. Because each active device within computer system 140 may access data in memory subsystems 144, potentially caching the data, a communication protocol implemented by memory subsystems 144 and active devices such as processing systems 142 may include a coherency protocol in order to maintain coherency between processing subsystems 142 and memory subsystems 144. Each client in FIG. 1 may be configured to participate in the communication protocol by sending address messages on address network 150 and data messages on data network 152 using split-transaction packets.

Memory subsystems 144 are configured to store data and instruction code for use by processing subsystems 142 and I/O subsystem 146. Memory subsystems 144 may include dynamic random access memory (DRAM), although other types of memory may be used in some embodiments.

I/O subsystem 146 is illustrative of a peripheral device such as an input-output bridge, a graphics device, a networking device, etc. In some embodiments, I/O subsystem 146 may include a cache memory subsystem similar to those of processing subsystems 142 for caching data associated with addresses mapped to one of memory subsystems 144.

In one embodiment, data network 152 may be a logical point-to-point network. Data network 152 may be implemented as an electrical bus, a circuit-switched network, or a packet-switched network. In embodiments where data network 152 is a packet-switched network, packets may be sent through the data network using techniques such as wormhole, store and forward, or virtual cut-through. In a circuit-switched network, a particular client device may communicate directly with a second client device via a dedicated point-to-point link that may be established through a switched interconnect mechanism. To communicate with a third client device, the particular client device utilizes a different link as established by the switched interconnect than the one used to communicate with the second client device. Messages upon data network 152 are referred to herein as data packets.

Address network 150 accommodates communication between processing subsystems 142, memory subsystems 144, and I/O subsystem 146. Messages upon address network 150 are generally referred to as address packets. When an address packet references a storage location within a memory subsystem 144, the referenced location may be specified via an address conveyed within the address packet upon address network 150. Subsequently, data corresponding to the address packet on the address network 150 may be conveyed upon data network 152. In one embodiment, address packets may correspond to requests for an access right (e.g., a readable or writable copy of a cacheable coherency unit whose address maps to a memory subsystem 144) or requests to perform a read or write to a non-cacheable memory location (e.g., data whose address maps to an I/O subsystem 146). Such address packets may be sent by a device in order to initiate a transaction to access or gain an access right to data at a particular non-cacheable or cacheable address. In transactions for cacheable addresses, subsequent address packets may be sent as part of that transaction by other devices in order to implement the access right and/or ownership changes needed to satisfy the transaction. In the computer system 140 shown in FIG. 1, a transaction may include one or more packets upon address network 150 and data network 152. Typical transactions involve one or more address and/or data packets that implement data transfers, ownership transfers, and/or changes in access privileges. Communications upon address network 150 may be point-to-point or broadcast, depending on the embodiment. Note that in some embodiments, address network and data network 152 may be implemented using the same physical interconnect.

Address Packet Variable-Size Mask Format

An active device may generate an address packet and send that address packet on the address network in order to request access to data at a particular address. In one embodiment, an initiating device 142A may initiate a transaction requesting access to a particular quantity of data by sending an address packet specifying that data and the requested access right (for cacheable addresses) or type of access to be performed (for non-cacheable addresses). For example, an active device may initiate a transaction for a non-cacheable address mapped to an I/O device 146 by sending an address packet on the address network to the I/O device 146. The address network 150 may convey the address packet to one or more receiving devices. Note that the address packet sent by the initiating device 142A may be handled by one or more intervening devices (e.g., a memory subsystem 144 or directory) before being provided to a receiving device in some embodiments.

The address packet may include a command field indicating the requested type of access and/or access right (e.g., as defined within a coherency protocol) and an address field containing an address identifying the data to be accessed or to which access is requested. In response to such an address packet, a device that maps the specified address may respond by updating the value of the specified data and/or by sending one or more address and/or data packets on the address and/or data networks respectively.

Active devices within computer system 140 may be configured to generate address packets that include a mask format having a variable size. The mask format may include N bits and indicate which of N X-byte quantities, starting at a given address, to access (e.g., read or write for non-cacheable addresses) or for which an access right (e.g., read and/or write access for cacheable addresses) is requested. The value of X may be indicated by a granularity field within the address packet.

Figures 2, 3:
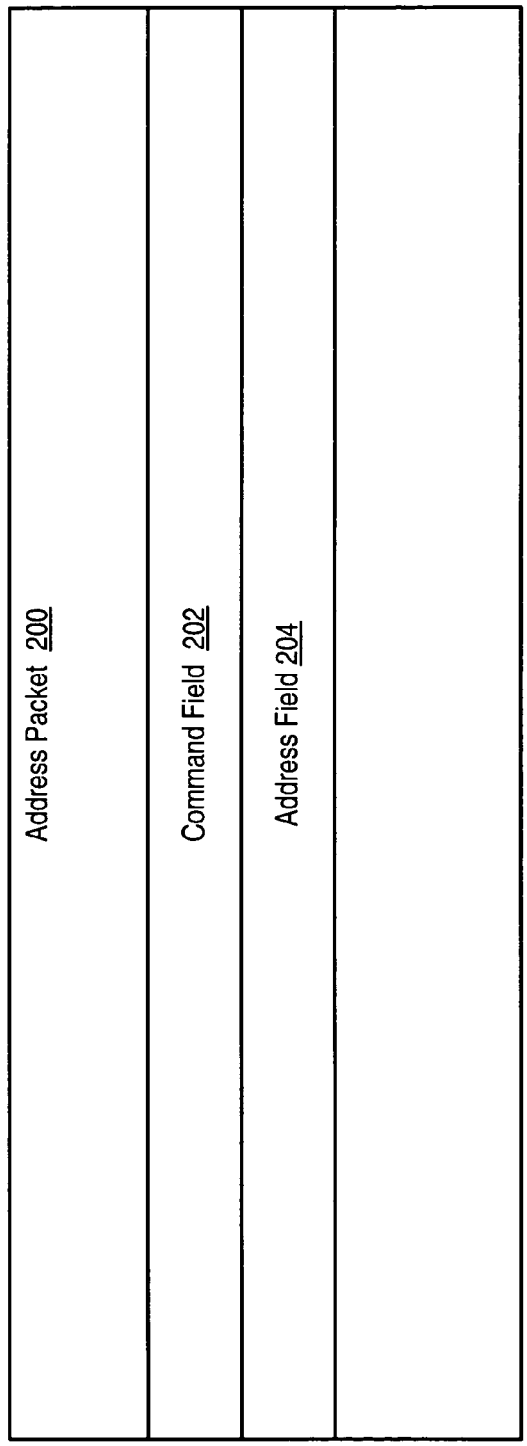
FIG. 2 illustrates an address packet, according to one embodiment.
FIG. 3 shows an exemplary command field that may be included in an address packet, according to one embodiment.

FIG. 2 illustrates an exemplary address packet 200, according to one embodiment. As shown, an address packet 200 may include a command field 202 and an address field 204. The address packet 200 may include several other fields, such as a device ID field identifying the device that initiated the transaction of which that address packet is a part and/or a transaction ID field identifying the transaction among several outstanding transactions initiated by a particular device.

The command field 202 may indicate the type of transaction of which the address packet is part. The type of transaction may correspond to the type of access or access right requested by the initiator of the transaction. For example, in one embodiment, a command field may indicate any of various cacheable commands such as RTO (Read-to-Own, used to request write access to a cacheable coherency unit), RTS (Read-to-Share, used to request read access to a cacheable coherency unit), WB (Write Back, used to write a modified cacheable coherency unit back to memory) and non-cacheable commands such as RIO (Read Input/Output, used to read from a non-cacheable address) and WIO (Write Input/Output, used to write to a non-cacheable address).

The address field 204 may indicate the address of the data to be accessed or to which an access right is requested. The address field 204 may include fewer than all of the address bits needed to specify a particular quantity of data. The remaining address bits not included in the address field may be implicit (e.g., the value of the remaining address bits may be implicitly zero) for certain values of the command field. For example, in situations in which the smallest addressable data quantity is a byte, certain commands may operate on aligned 64-byte quantities, and thus the lowest six address bits may be implicitly zero for those commands. For other values of the command field, the variable-size mask may be used to select the data on which to operate.

FIG. 3 illustrates an exemplary command field 202, according to one embodiment. For at least some values of the command field, a portion of the command field may be used to indicate the granularity 210 of the mask, indicated here by MaskType[3:0] at Cmd[11:8]. Another portion of the command field, here Cmd[7:0] may indicate the mask 212 itself, shown here as Mask[7:0]. In this embodiment, only non-cacheable WIO and RIO commands use the variable-size mask. Accordingly, the use of the variable-size mask, as specified by Cmd[11:0], is indicated by Cmd[13:12] having a value of either '01', indicating a RIO command, or '11', indicating a WIO command. In this embodiment, commands such as RTO and RTS that target cacheable addresses may use additional Cmd bits to specify the particular command and may not include bits specifying a variable-size mask. However, in other embodiments, such a variable-size mask may be used for both cacheable and non-cacheable commands (or for just cacheable commands). Note also that the amount of granularity information 210 and mask information 212 may vary among embodiments. Additionally, granularity 210 and mask 212 information may not be included in the command field 202 in some embodiments.

If particular granularities of the variable-size mask are selected within the address packet 200, a portion of the command field 204 used to indicate the granularity of the mask may also include additional non-implicit address bits. These address bits may be implicit for other granularities and for commands that do not use the variable-size mask.

In some embodiments, for each different selectable granularity X of the variable-size mask, a different number of address bits may be implicit for each of the N X-byte quantities identified in the mask field. For example, if a 1-byte granularity is selected and there are eight bits in the mask field such that the mask field can select any of eight bytes, the value of the last three address bits may be implicit for each of the quantities identifiable by each bit in the mask field. For example, the lowest order bit of the N bits in the mask may correspond to the byte at the address ending in "000", the next lowest order bit may correspond to the byte at the address ending in "001", and so on. If instead an 8-byte granularity is selected, the value of the last six address bits may be implicit. When the granularity field indicates a selected granularity for which fewer address bits are implicit, a portion of the granularity field may be used to store additional non-implicit address bits. When instead the granularity field indicates a selected granularity for which more address bits are implicit, that portion of the granularity field may be used to specify the selected granularity.

Depending on the granularity indicated in MaskType[3:0], at least some of the bits included in MaskType[3:0] may be used as additional address bits instead of being used to specify a granularity, as shown in FIG. 4. In this example, the address field 204 of the address packet 200 includes bits J−1 to 6 of the J-bit address. The illustrated embodiment may support four granularities: 1 byte, 2 bytes, 4 bytes, and 8 bytes. When the eight-byte granularity is indicated in MaskType[3:0], none of the bits in MaskType[3:0] may be used as address bits. When the four-byte granularity is indicated, MaskType[3] may include Address[5]. When the two-byte granularity is indicated, MaskType[3:2] indicates Address[5:4]. When the one-byte granularity is indicated, MaskType[3:1] indicates Address[5:3].

In the illustrated embodiment, different granularities are indicated by the lowest bit within MaskType[3:0] that has a logical value of '1'. For example, when the lowest bit Mask-Type[0] is set to '1', it indicates that a one-byte granularity is selected and that the remaining bits [3:1] within MaskType are used as address bits. If MaskType[1] is the lowest bit within MaskType that has a value of '1', it indicates that a two-byte granularity is selected and that the remaining bits [3:2] within MaskType are used as address bits. When Mask-Type[2] is the lowest bit within MaskType that has a value of '1', it indicates that a four-byte granularity is selected and that the remaining bit MaskType[3] is used as an address bit. When MaskType[3] is the lowest bit within MaskType having a value of '1', it indicates that an eight-byte granularity is selected and that none of the bits in MaskType are used as address bits.

Using a MaskType encoding such as the one shown in FIG. 4 may reduce the number of bits needed to specify granularity and addresses. For example, if separate fields are used to specify the granularity and to specify additional address bits for certain granularities, the number of bits in those two separate fields may exceed the number of bits in the dual-purpose MaskType field, which may specify both granularity and address bits.

Each of the N data quantities (here, N=8) of the specified granularity at the specified address may be selected by setting a corresponding bit in Mask[7:0]. FIG. 4 shows the meaning of the mask field 212 for each selectable granularity. If a one-byte granularity is selected, the mask selects one or more of the eight 1-byte quantities at locations starting at the address specified in the address field 204 and the highest three bits of MaskType. A device that processes the address packet 200 may apply the command specified in command field 202 to the selected data quantities identified in the mask field 212. For example, if a three byte RIO is requested, the mask may show which three of the eight one-byte quantities to read from an eight-byte quantity of data identified by an address that includes three bits of address information from the granularity field 210 appended to the higher-order address bits from the address field 204. The recipient device that processes the address packet specifying the three-byte RIO may send a data packet on the data network containing the three selected 1-byte quantities to the active device that initiated the RIO (i.e., the active device that sent the address packet).

FIG. 5 shows how each bit in the mask field 212 may select a different-sized quantity of data dependent on the granularity indicated in the granularity field 210. In this example, addresses are 47 bits long. The address field 204 includes address bits 46 through 6, and the granularity field 210 selectively includes address bits 5-3 depending on the selected granularity. When the selected granularity is 1-byte, address bits 46 through 3 are available (bits 46-6 are available from the address field 204 and bits 5-3 are available from the granularity field). Each of the eight bytes addressable by Address[46:3] is associated with a respective bit in the mask field 212. For example, the lowest-order bit in the mask field 212, Mask[0], is associated with the byte at Address[46:3], 000. If Mask[0] is set, it indicates that the associated byte should be accessed (or that an access right to that byte is requested) as indicated by the command in the command field 202. Each other bit in the mask field 212 corresponds to a different byte. In one embodiment, active devices that initiate transactions by sending address packets may be configured to always select at least one of the X-byte quantities when sending address packets that include a variable-size mask.

When a two-byte granularity is selected, address bits 46-4 are available (bits 46-6 in the address field 204 and bits 5-4 in the granularity field 210). Each of the eight two-byte quantities addressable by Address[46:4] is associated with a respective one of the bits in the mask field 212. For example, as shown, the two-byte quantity at Address[46:4],0000-Address [46:4],0001 is associated with Mask[0].

If a four-byte granularity is selected, address bits 46-5 are available (bits 46-6 in the address field 204 and bit 5 in the granularity field 210). Eight four-byte quantities are addressable by Address[46:5], each of which is associated with a respective bit in the mask field 212. For example, the four-byte quantity at Address[46:5],0100-Address[46:5], 0111 is associated with Mask[1].

When an eight-byte granularity is selected, address bits 46-6 are available in the address field 204. In this embodiment, no address bits are available in the granularity field 212 when the largest granularity is selected. Each of the eight eight-byte quantities addressed by Address[46:6] is associated with a respective bit in the mask field 212. For example, the eight-byte quantity at Address[46:6],011000-Address[46:6],011111 is associated with Mask[3].

Figure 6:
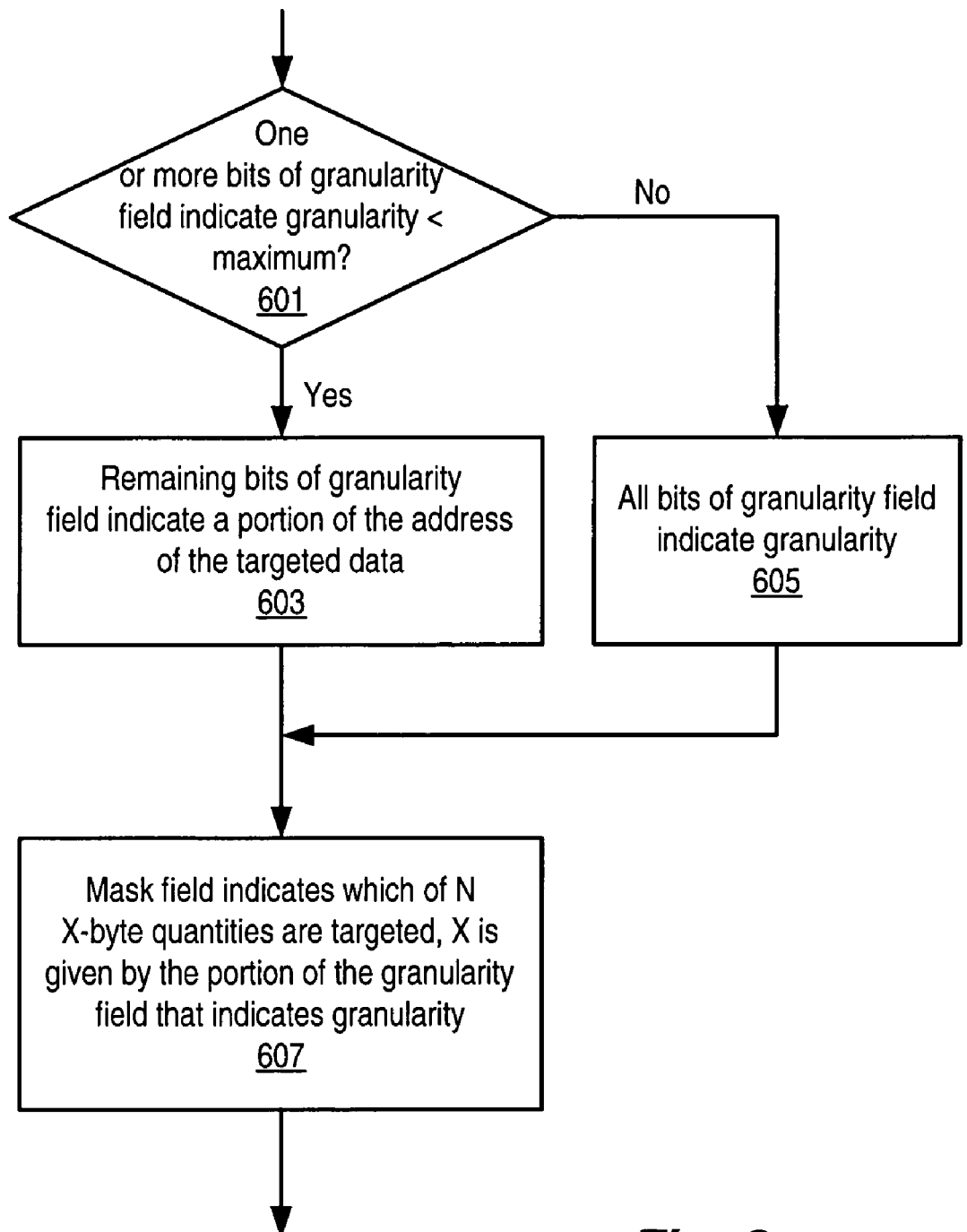
FIG. 6 is a flowchart of a method of operating a computer system, according to one embodiment.

FIG. 6 illustrates one embodiment of a method of using a variable-size mask in an address packet. The address packet includes a granularity field, a mask field, a command field, and an address field. The granularity field and/or mask field may be included in the command field in some embodiments (e.g., the same address packet bits may be used as command bits in some address packets and granularity and/or mask bits in other address packets). The command field indicates a type of access to be performed or access right requested. The address field includes at least some of the bits of the address of the targeted data. The mask field identifies which of N X-byte data quantities addressed by the address bits included in the address packet should be accessed according to the command specified in the command field. The granularity field indicates the selected value of X. If the selected value of X is less than a maximum value of X, the granularity field may also include one or more additional bits of the address. These additional address bits may, in some embodiments, be appended to the address bits included in the address field to obtain the address of the N X-byte data quantities.

If one or more bits of the granularity field indicate that the granularity is less than the maximum granularity, as determined at 601, the remaining bits of the granularity field (other than the one or more that indicate that the granularity is less than the maximum) may indicate a portion of the address of the targeted data, as shown at 603. If the granularity is equal to the maximum granularity, all of the bits of the granularity field may indicate granularity and none of the granularity bits may store address bits, as indicated at 605. In one embodiment, the granularity may be indicated by the lowest-order non-zero bit in the granularity field. For example, if the lowest-order bit in the granularity field is set, the specified granularity is the minimum granularity. If the highest-order bit in the granularity field is the lowest-order non-zero bit, the maximum granularity is selected.

The granularity indicated by all or part of the granularity field indicates the size X, in bytes in this example, of the data quantity to which each bit in the mask field corresponds. Each bit in the mask field indicates whether an associated X-byte data quantity is included in the data to be accessed or to which an access right is requested in response to the address packet, as indicated at 607.

Figure 7:
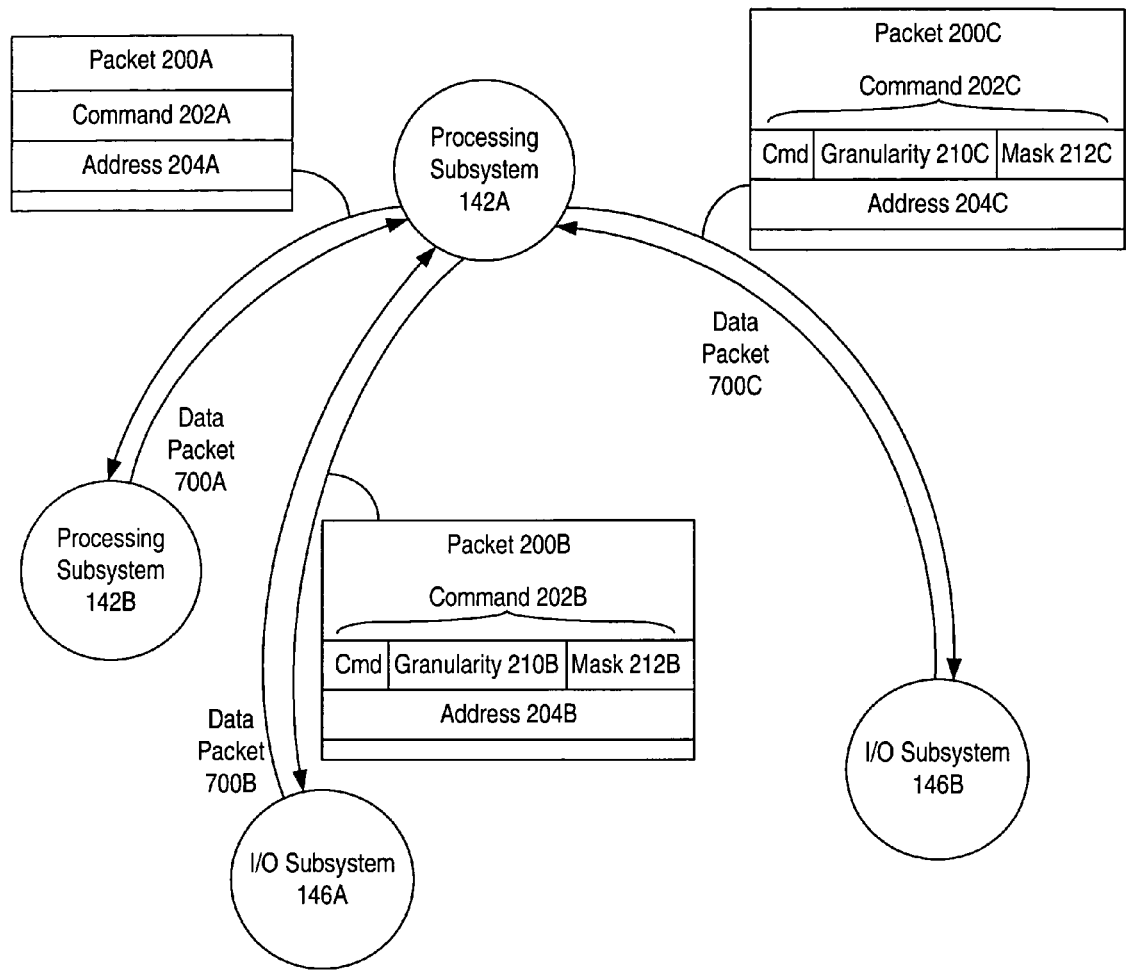
FIG. 7 shows an exemplary exchange of packets between devices, according to one embodiment.

FIG. 7 illustrates how devices in a multiprocessing computer system may communicate various address and data packets, according to one embodiment. In this example, two processing subsystems 142A and 142B and two I/O subsystems 146A and 146B are illustrated. Processing subsystem 142A initiates three different transactions involving three different addresses. These transactions may overlap in time and/or occur in any order.

Processing subsystem 142A initiates the first transaction to gain access to a cacheable coherency unit by sending an address packet 200A on the address network. The address packet 200A includes a command field 202A indicating the type of transaction (e.g., RTS, RTO) being initiated and an address field 204A including at least a portion of the address of the cacheable coherency unit. The command field 202A includes neither granularity information nor an address mask. Processing subsystem 142B currently has an ownership responsibility for the cacheable coherency unit. In response to receiving the address packet 200A and having ownership of the cacheable coherency unit, processing subsystem 142B sends a data packet 700A to the initiating processing subsystem 142A as part of the transaction. For example, if the command field 202A of address packet 200A specifies an RTS transaction, processing subsystem 142B may return a data packet containing a copy of the cacheable coherency unit to the initiating processing subsystem 142A.

The second transaction initiated by processing subsystem 142A is initiated to access non-cacheable data mapped to I/O subsystem 146A. Processing subsystem 142A initiates this transaction by sending an address packet 200B on the address network. Address packet 200B includes a command field 202B and an address field 204B indicating at least part of the address of the non-cacheable data. In this address packet 200B, processing subsystem 142A encodes a command portion Cmd (e.g., indicating the type of non-cacheable transaction such as RIO (Read I/O) or WIO (Write I/O)), a granularity-field 210B, and a mask field 212B. Processing subsystem 142A encodes a value in the granularity field 210B indicative of the size of each data quantity selectable by the mask field 212B. For example, if there are eight bits in the mask field 212B and processing subsystem 142A is initiating the second transaction to access four eight-byte quantities, processing subsystem 142A may encode a granularity field value indicating that an eight-byte granularity is selected and selectively set the bits in the mask field 212 corresponding to the desired four eight-byte quantities. The granularity field 210B may not include any address bits.

In response to receiving address packet 200B and mapping the non-cacheable data indicated by the portion of the address included in address field 204B, I/O subsystem 146A may process the address packet 200B. I/O subsystem 146A may determine that the command field 202B of address packet 200B includes a mask field 212B and granularity field 210B in response to the value of the Cmd portion of the command field. The I/O subsystem may decode the granularity field 210B to determine the size of data quantity to which each bit in the mask field corresponds. The size indicated by the granularity field 210B may also indicate that the granularity field 210B does not include any additional address bits of the address of the non-cacheable data. I/O subsystem 146A may determine which of the N data quantities addressable by the address bits included in address field 204B are to be accessed by determining which of the N bits in the mask field 212B are set.

In response to processing the address packet 200B, the I/O subsystem 146A may return a data packet 700B to processing subsystem 142A. For example, if the Cmd portion of the command field 202B indicates an RIO (Read I/O) transaction, I/O subsystem 146A may return a data packet 700B including a copy of the portions of the data at the address in address field 202B selected by the value of mask field 212B. If the Cmd portion of the command field 202B indicates a WIO (Write I/O) transaction, I/O subsystem 146A may return a "pull" data packet 700B to processing subsystem 142A indicating that I/O subsystem 146A is ready to receive the write data. In response, processing subsystem 142A may send an additional data packet (not shown) including the new value of the portions of the data at the address indicated by the address field 202B selected by the value of mask field 212B.

Processing subsystem 142A may initiate a third transaction for different non-cacheable data mapped to I/O subsystem 146B by sending a third address packet 200C on the address network. Packet 200C includes a command field 202C and an address field 204C that includes at least a portion of the address of the non-cacheable data. Processing subsystem 142A encodes a Cmd portion of the command field 202C to indicate the type of transaction being initiated. For example, the Cmd portion may indicate that a RIO (Read I/O) transaction is being initiated. Processing subsystem 142A encodes a granularity field 210C in the command field 202C indicating the size of each data quantity associated with one of the bits in the mask field 212C. In this address packet 200C, the processing subsystem 142A encodes additional address bits into a portion of the granularity field 210C that is not needed to indicate granularity. For example, the granularity may be indicated by the lowest-order set bit in the granularity field 210C. Bits that are higher than the lowest-order set bit may not be needed to indicate granularity, and thus these bits may store additional address bits to be appended to the address bits included in address field 204C. The processing subsystem 142A encodes the mask field 212C to indicate which of a set of data quantities are involved in the transaction. For example, if the processing subsystem 142A is initiating a RIO for six out of eight one-byte quantities addressable by the address bits in the address field 204C and granularity field 210C, the processing subsystem 142A may set the six bits of the mask field 212C that correspond to the desired six bytes and clear the two bits of the mask field 212C associated with the other two bytes.

In response to mapping the non-cacheable data addressed by the address field 204C and receiving address packet 200C, I/O subsystem 146B may process address packet 200C. I/O subsystem 146B may determine the transaction to be performed from the Cmd portion of the command field 202C. Based on the granularity indicated in the granularity field 210C, I/O subsystem 146B determines that the granularity field 210C also includes additional address bits to be appended to the address bits in address field 204C. I/O subsystem 146B also identifies which of the N data quantities of the size indicated by the granularity field 210C addressed by the address bits in address field 204C and granularity field 210C are targeted in the transaction based on which of the N bits in the mask field 212C are set. In response to the address packet 200C, I/O subsystem 146B may return a data packet 700C to the initiating processing subsystem 142A. For example, if the Cmd portion of command field 202C indicates an RIO transaction, I/O subsystem 146B may return a data packet that includes a copy of each data quantity selected by mask field 212C.

As the example of FIG. 7 shows, the same communication protocol may support various different address packet formats. Some address packets (e.g., 200B and 200C) may include variable-size masks, while others (e.g., 200A) may not. The variable-size mask may be included as part of the command field for certain commands. Similarly, the granularity fields in some address packets (e.g., 200C) may include address bits while the granularity fields in other address packets (e.g., 200B) may not. The inclusion of address bits in an address packet's granularity field may depend on the granularity indicated by the granularity field.

Note that all values herein refer to the logical values of signals or bits, and not to electrical levels. For example, a 1 value, or a signal that is asserted, refers to a signal with the given logical meaning, regardless of how that signal is implemented. Similarly, a set bit refers to a bit with a given logical meaning.

Numerous variations and modifications will become apparent to those skilled in the art once the above disclosure is fully appreciated. For example, while the granularity field is described above as indicating granularity in bytes, other embodiments may indicate different granularities (e.g., words, megabytes, etc.). It is intended that the following claims be interpreted to embrace all such variations and modifications.

What is claimed is:

1. A system, comprising:
    a device configured to initiate a transaction by sending an address packet including an address corresponding to stored data, wherein the address includes address bits; and
    an additional device configured to respond to the address packet, wherein the additional device is coupled to receive the address packet from the device via an address network;
    wherein the address packet further includes a mask field configured to indicate which of N quantities of the data are targeted by the transaction, where N comprises a non-zero whole number;
    wherein the address packet includes a granularity field configured to indicate a size, in bytes, of each of the N quantities of the data, wherein if the size is less than a maximum size, a portion of the granularity field stores additional address bits of an address of the N quantities of the data; and
    wherein if the size is the maximum size, none of the granularity field stores any additional address bits of the address of the N quantities of the data.

2. The system of claim 1, wherein the device is configured to encode the granularity field in a portion of a command field of the address packet if a command portion of the command field indicates one type of command, and wherein the device is configured to encode additional command bits in the portion of the command field if the command portion of the command field indicates other types of commands.

3. The system of claim 2, wherein the device is configured to send an additional address packet to initiate another transaction, wherein the device is configured to encode a value indicative of a command in all of the command field of the additional address packet, and wherein the command field of the additional address packet does not include any granularity information.

4. The system of claim 1, wherein the device is configured to encode the mask field in a portion of a command field of the address packet if a command portion of the command field indicates one type of command, and wherein the device is configured to encode additional command bits in the portion of the command field if the command portion of the command field indicates other types of commands.

5. The system of claim 1, wherein the device is configured to encode the mask field and the granularity field in address packets sent to initiate transactions targeting the data when the data comprises non-cacheable data.

6. The system of claim 5, wherein the device is configured to not encode the mask field and the granularity field in address packets sent to initiate transactions targeting the data when the data comprises cacheable data.

7. The system of claim 1, wherein the device is configured to include at least a minimum number of address bits in an address field of each address packet sent by the device;
    wherein if the granularity field indicates the size of each of the N quantities of the data is less than a maximum size, the additional device is configured to append the additional address bits included in the portion of the granularity field to the address bits in the address field to obtain an address of the N quantities of the data.

8. The system of claim 1, wherein the device is configured to select one of a plurality of sizes to be indicated in the granularity field, wherein for each of the plurality of sizes, the device is configured to encode a different number of additional address bits in the granularity field.

9. The system of claim 8, wherein the additional device is configured to determine which one of the plurality of sizes is indicated by the granularity field by identifying which bit in the granularity field is a lowest-order set bit in the granularity field.

10. The system of claim 9, wherein the additional device is configured to use any bits in the granularity field higher than the lowest-order set bit as address bits.

11. A system, comprising:
a device configured to initiate a transaction to access data by sending an address packet including an address corresponding to stored data, wherein the address includes address bits; and
an additional device configured to respond to the address packet, wherein the additional device is coupled to receive the address packet from the device via an address network;
wherein the address packet includes a mask field configured to indicate which of N quantities of the data are to be accessed, where N comprises a non-zero whole number;
wherein the address packet includes a granularity field configured to indicate a size, in bytes, of each of the N quantities of the data, wherein the device is configured to encode a value in the granularity field indicating one of a plurality of sizes; and
wherein the device is configured to send an additional address packet to initiate an additional transaction to access additional data, wherein the additional address packet does not include a mask field and does not include a granularity field.

12. A method, comprising:
a device initiating a transaction by sending an address packet including an address corresponding to stored data, wherein the address includes address bits; and
an additional device receiving the address packet from the device via an address network;
wherein the address packet includes a mask field configured to indicate which of N quantities of the data are targeted by the transaction, where N comprises a non-zero whole number;
wherein the address packet includes a granularity field configured to indicate a size, in bytes, of each of the N quantities of the data, wherein if the size is less than a maximum size, a portion of the granularity field stores additional address bits of an address of the N quantities of the data; and
wherein if the size is the maximum size, none of the granularity field stores any additional address bits of the address of the N quantities of the data.

13. The method of claim 12, further comprising:
the device encoding the granularity field in a portion of a command field of the address packet if another portion of the command field indicates one type of command; and
the device encoding additional command bits in the portion of the command field if the other portion of the command field indicates other types of commands.

14. The method of claim 13, further comprising:
the device sending an additional address packet to initiate another transaction; and
the device encoding a value indicative of a command in all of the command field of the additional address packet, wherein the command field of the additional address packet does not include any granularity information.

15. The method of claim 12, further comprising:
the device encoding the mask field in a portion of a command field of the address packet if a command portion of the command field indicates one type of command; and
the device encoding additional command bits in the portion of the command field if the command portion of the command field indicates other types of commands.

16. The method of claim 12, further comprising the device encoding the mask field and the granularity field in address packets sent to initiate transactions targeting the data when the data comprises non-cacheable data.

17. The method of claim 16, further comprising the device not encoding the mask field and the granularity field in address packets sent to initiate transactions targeting the data when the data comprises cacheable data.

18. The method of claim 12, further comprising:
the device including at least a minimum number of address bits in an address field of each address packet sent by the device; and
if the granularity field indicates the size of each of the N quantities of the data is less than a maximum size, the additional device appending the additional address bits included in the portion of the granularity field to the address bits in the address field to obtain an address of the N quantities of the data.

19. The method of claim 12, further comprising the device selecting one of a plurality of sizes to be indicated in the granularity field, wherein for each of the plurality of sizes, the device encodes a different number of additional address bits in the granularity field.

20. The method of claim 19, further comprising the additional device determining which one of the plurality of sizes is indicated by the granularity field by identifying which bit in the granularity field is a lowest-order set bit in the granularity field.

21. The method of claim 20, further comprising the additional device using any bits in the granularity field higher than the lowest-order set bit as address bits.

* * * * *

UNITED STATES PATENT AND TRADEMARK OFFICE
CERTIFICATE OF CORRECTION

PATENT NO. : 7,606,932 B1 Page 1 of 1
APPLICATION NO. : 10/713397
DATED : October 20, 2009
INVENTOR(S) : Robert E. Cypher It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1740 days.

Signed and Sealed this

Twelfth Day of October, 2010

David J. Kappos
*Director of the United States Patent and Trademark Office*